US012467614B2

(12) United States Patent
Koenig et al.

(10) Patent No.: US 12,467,614 B2
(45) Date of Patent: Nov. 11, 2025

(54) PAN AND TILT CONTROL OF LUMINAIRE

(71) Applicant: SIGNIFY HOLDING B.V., Eindhoven (NL)

(72) Inventors: Paul Koenig, Dallas, TX (US); Travis Reinert, Mckinney, TX (US); Michelle Kessler, Dallas, TX (US)

(73) Assignee: SIGNIFY HOLDING B.V., Eindhoven (NL)

( * ) Notice: Subject to any disclaimer, the term of this patent is extended or adjusted under 35 U.S.C. 154(b) by 12 days.

(21) Appl. No.: 18/567,209

(22) PCT Filed: Jun. 2, 2022

(86) PCT No.: PCT/EP2022/065076
§ 371 (c)(1),
(2) Date: Dec. 5, 2023

(87) PCT Pub. No.: WO2022/258489
PCT Pub. Date: Dec. 15, 2022

(65) Prior Publication Data
US 2024/0263769 A1 Aug. 8, 2024

Related U.S. Application Data

(60) Provisional application No. 63/197,734, filed on Jun. 7, 2021.

(30) Foreign Application Priority Data

Jun. 22, 2021 (EP) ..................... 21180904

(51) Int. Cl.
*F21V 21/30* (2006.01)
*F21V 21/15* (2006.01)
(Continued)

(52) U.S. Cl.
CPC .............. *F21V 21/30* (2013.01); *F21V 21/15* (2013.01); *F21V 23/0435* (2013.01);
(Continued)

(58) Field of Classification Search
CPC ............. F21V 23/0435; F21V 23/0457; F21V 23/0492; F21V 21/30; F21V 21/15; H05B 47/105; H05B 47/196
See application file for complete search history.

(56) References Cited

U.S. PATENT DOCUMENTS 4,740,690 A 4/1988 Mosier
10,240,768 B1 * 3/2019 Foster ...................... F21S 8/02
(Continued)

FOREIGN PATENT DOCUMENTS

EP 2103865 A1 9/2009
JP 2010161006 A 7/2010
(Continued)

*Primary Examiner* — Christopher E Dunay

(57) ABSTRACT

An automated luminaire includes a head that includes a light source. The head is rotatable about a tilt axis and about a pan axis. The automated luminaire further includes a first pan absolute encoder, a second pan absolute encoder, and a controller configured to determine a pan position of the head. The controller is configured to determine the pan position of the head based on first rotational position information received from the first pan absolute encoder and second rotational position information received from the second pan absolute encoder.

18 Claims, 16 Drawing Sheets

(51) Int. Cl.
*F21V 23/04* (2006.01)
*H05B 47/105* (2020.01)
*H05B 47/175* (2020.01)

(52) U.S. Cl.
CPC ...... *F21V 23/0457* (2013.01); *F21V 23/0492* (2013.01); *H05B 47/105* (2020.01); *H05B 47/196* (2024.01)

(56) References Cited

U.S. PATENT DOCUMENTS

| | | | |
|---|---|---|---|
| 10,274,175 B1* | 4/2019 | Wood | G01D 5/145 |
| 2015/0003099 A1* | 1/2015 | Rasmussen | F21S 10/00 |
| | | | 362/523 |
| 2017/0009969 A1 | 1/2017 | Conti et al. | |
| 2024/0035647 A1* | 2/2024 | Veenstra | F21V 21/15 |
| 2024/0328599 A1* | 10/2024 | Schweiner | F21V 23/0442 |
| 2024/0329511 A1* | 10/2024 | Schweiner | G03B 21/206 |

FOREIGN PATENT DOCUMENTS

| | | |
|---|---|---|
| JP | 2021018953 A | 2/2021 |
| WO | 2013139338 A1 | 9/2013 |

\* cited by examiner

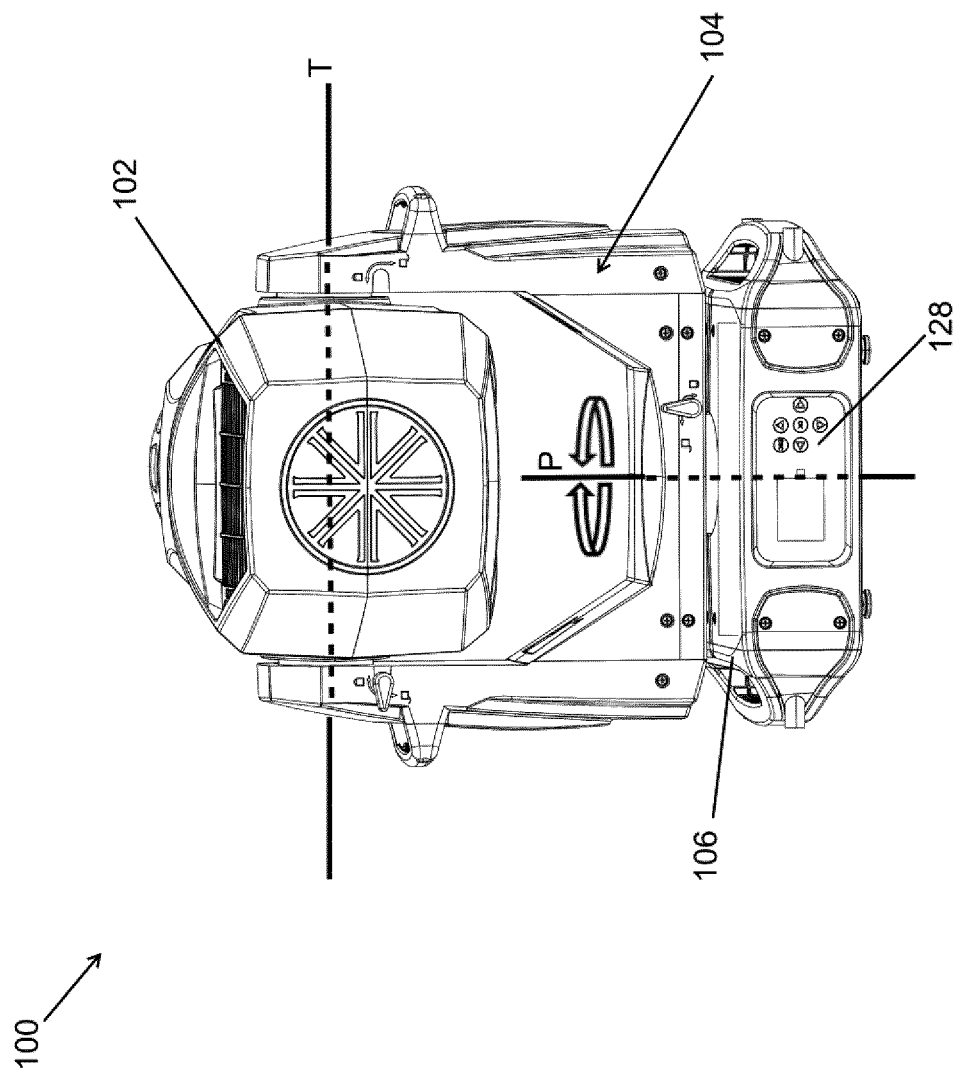

PAN AND TILT CONTROL OF LUMINAIRE

CROSS-REFERENCE TO PRIOR APPLICATIONS

This application is the U.S. National Phase application under 35 U.S.C. § 371 of International Application No. PCT/EP2022/065076, filed on Jun. 2, 2022, which claims the benefit of European Patent application Ser. No. 21180,904.1, filed on Jun. 22, 2021, and U.S. Application Ser. No. 63/197,734, filed on Jun. 7, 2021. These applications are hereby incorporated by reference herein.

TECHNICAL FIELD

The present disclosure relates generally to lighting fixtures, and more particularly to a pan and tilt control of automated luminaires.

BACKGROUND

An automated luminaire can be positioned to direct its light toward a desired location by rotating about pan and tilt axes. An automated luminaire typically undergoes a device setup process with respect to each axis to detect the current position of luminaire's head and to move the head from the detected position to a default position or to an otherwise desired position. For example, a device setup process of an installed automated luminaire may be performed when an automated luminaire is powered on or when the head of the luminaire is unintentionally moved. In general, the device setup process to detect the tilt and pan positions of the head and move the head to a particular position typically takes an undesirably long time. Performing the relatively long device setup process, for example, at every power-up of the automated luminaire can also be inconvenient. Further, noise that may be generated during a re-calibration can be disruptive, for example, if an installed luminaire is calibrated in the middle of a show. Furthermore, risks that an automated luminaire that is installed in a tight space can collide with other structures during calibration may be undesirably high. Thus, a solution that facilitates the detection of the current position of a luminaire's head and the movement of the head to a particular position is desirable.

EP2103865 discloses a light fixture with a fixed element and moving elements with an orientation sensor that detects three orthogonal axes which transmits orientation signals to an internal processor which calculates the actual fixed element orientation. U.S. Pat. No. 4,740,690 discloses an encoder that includes multiple small absolute encoders coupled through a fixed gear ratio, where the size of the absolute encoder is the sum of the individual sizes of multiple encoders and the resolution is proportional to a multiplication of the individual encoder positions to allow for determining an absolute indication of position.

SUMMARY

The present disclosure relates generally to lighting fixtures, and more particularly to a pan and tilt control of automated luminaires. In an example embodiment, an automated luminaire includes a head that includes a light source. The head is rotatable about a tilt axis and about a pan axis. The automated luminaire further includes a first pan absolute encoder, a second pan absolute encoder, and a controller configured to determine a pan position of the head. The controller is configured to determine the pan position of the head based on first rotational position information received from the first pan absolute encoder and second rotational position information received from the second pan absolute encoder.

In another example embodiment, a method of operating an automated luminaire includes receiving, by a controller of the automated luminaire, first rotational position information from a first pan absolute encoder of the automated luminaire, and receiving, by the controller, second rotational position information from a second pan absolute encoder of the automated luminaire. The method 1400 further includes determining, by the controller, a pan position of a head of the automated luminaire. The controller is configured to determine the pan position of the head based on the first rotational position information and the second rotational position information. The head comprises a light source and is rotatable about a tilt axis and about a pan axis.

These and other aspects, objects, features, and embodiments will be apparent from the following description and the appended claims.

BRIEF DESCRIPTION OF THE FIGURES

Reference will now be made to the accompanying drawings, where:

FIGS. 1A-1C illustrate different views of an automated luminaire according to an example embodiment:

Figure 1A:
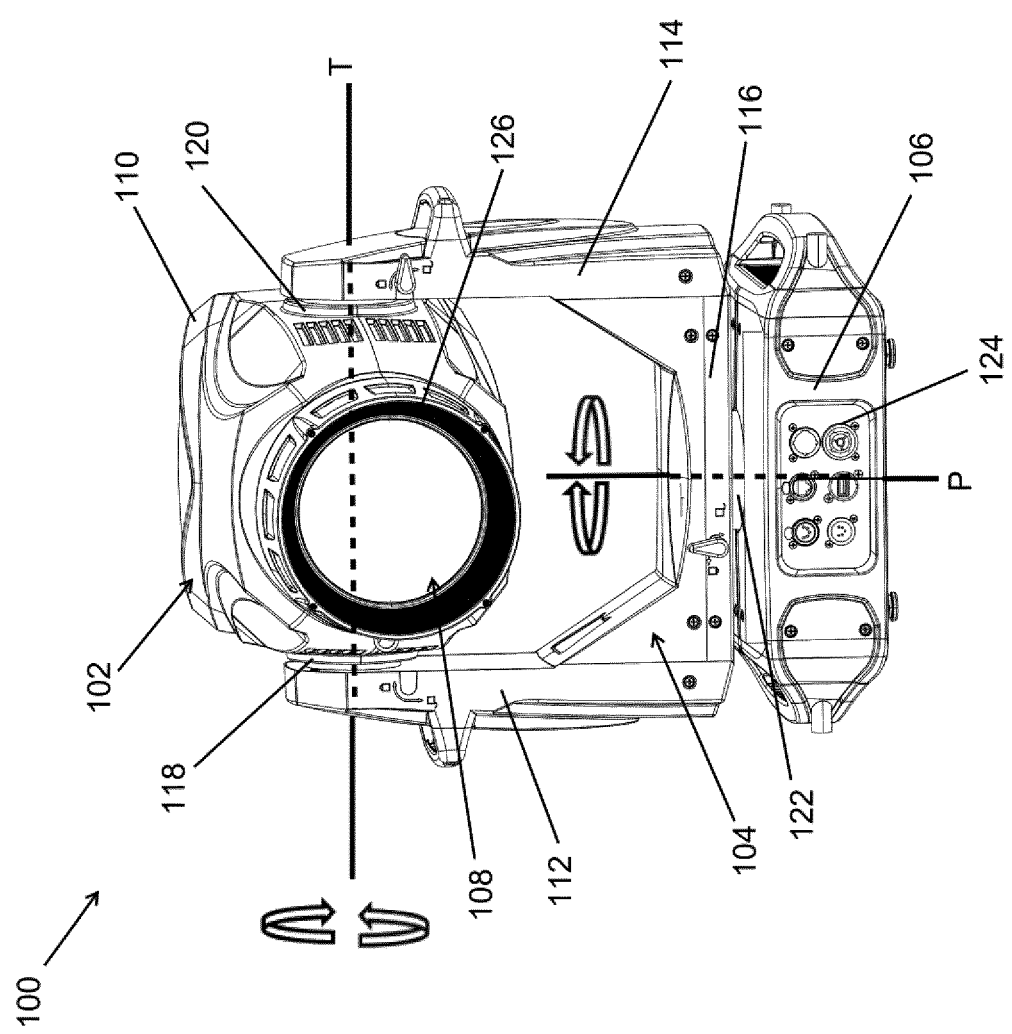
Figure 1C:
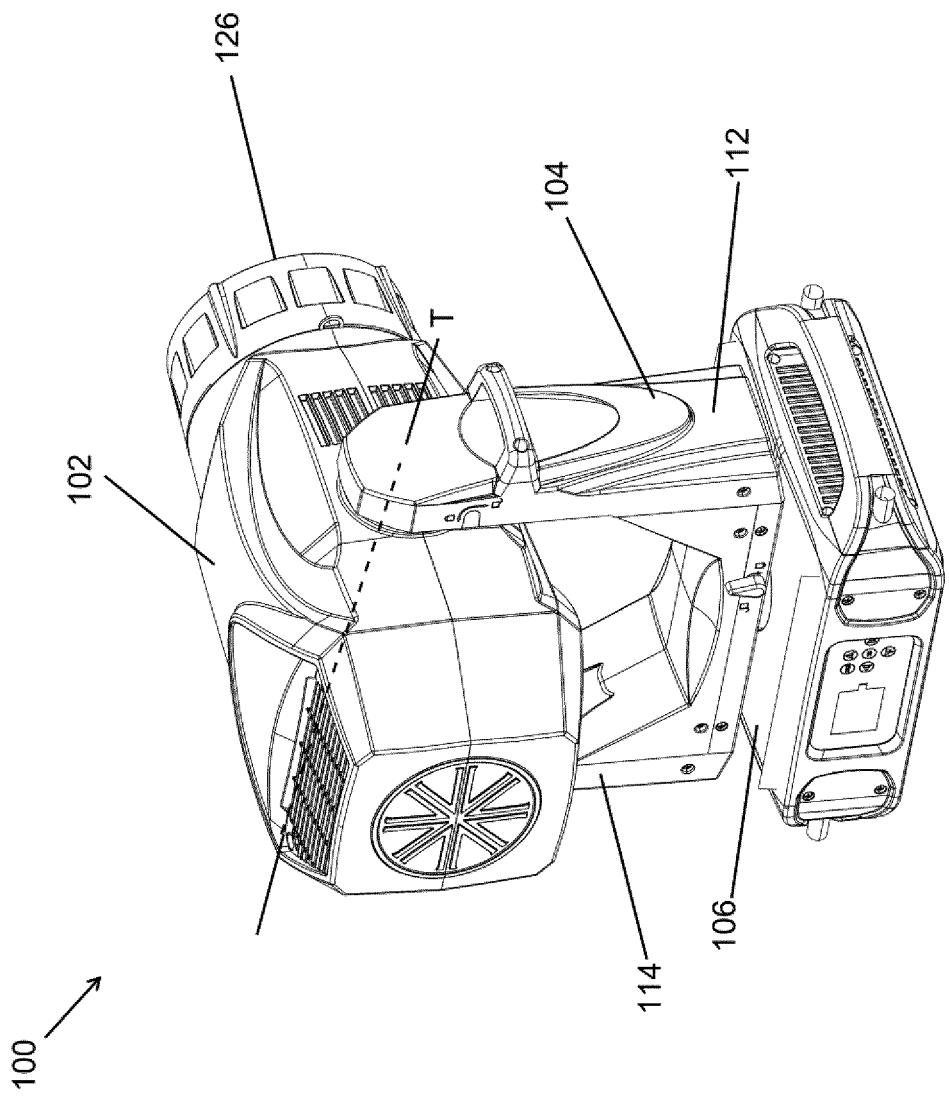

The drawings illustrate only example embodiments and are therefore not to be considered limiting in scope. The elements and features shown in the drawings are not necessarily to scale, emphasis instead being placed upon clearly illustrating the principles of the example embodiments. Additionally, certain dimensions or placements may be exaggerated to help visually convey such principles. In the drawings, the same reference numerals that are used in different drawings designate like or corresponding, but not necessarily identical elements.

DETAILED DESCRIPTION OF EXAMPLE EMBODIMENTS

In the following paragraphs, particular embodiments will be described in further detail by way of example with reference to the figures. In the description, well known components, methods, and/or processing techniques are omitted or briefly described. Furthermore, reference to various feature(s) of the embodiments is not to suggest that all embodiments must include the referenced feature(s).

FIGS. 1A-3 illustrate different views of an automated luminaire 100 according to an example embodiment. In some example embodiments, the automated luminaire 100 includes a head 102, a frame 104, and a base 106. The head 102 may include a light source 108 that emits a light that is provided by the head 102 through an opening at a front section 126 of the head 102. In general, the head 102 provides the light towards an area pointed to by the front section 126.

In some example embodiments, the automated luminaire 100 may also include ports 124. For example, the ports 124 may include power and communication ports that can be used to provide power to the automated luminaire 100 and to communicate with the automated luminaire 100 as can be readily understood by those of ordinary skill in the art with the benefit of the scope of this disclosure. The automated luminaire 100 may also include a user interface 128 that can be used to provide user inputs to the automated luminaire 100 and to display information (e.g., status) by the automated luminaire 100.

In some example embodiments, the head 102 is rotatable about a tilt axis T and about a pan axis P. For example, in the orientation of the automated luminaire 100 shown in FIGS. 1A-3, the tilt axis T may be a horizontal (imaginary) axis and the pan axis P may be a vertical (imaginary) axis. The head 102 may be attached to the frame 104 such that the head 102 can rotate about the tilt axis T independent of (i.e., not along with) the frame 104. In general, the head 102 may be rotated about the tilt axis T to a desired tilt position in a tilt range (e.g., <360 degrees, 270 degrees, etc.). For example, the head 102 may be rotated to the tilt positions shown in FIGS. 1C and 2.

In some example embodiments, the head 102 is also attached to the frame 104 such that the head 102 can rotate about the pan axis P along with the frame 104. That is, the head 102 and the frame 104 can rotate together about the pan axis P. In general, the head 102 may be rotated about the pan axis P to a desired pan position in a pan range (e.g., 2 full rotations or 3 full rotations). For example, the head 102 may be rotated about the pan axis P to the pan positions shown in FIGS. 1A and 3 within a first full rotation, a second full rotation, and a third full rotation of the head 102.

In some example embodiments, the frame 104 may be yoke-shaped and may include arms 112, 114 and a middle section 116 that extends between the arms 112, 114. The head 102 may be between the arms 112, 114 and may be attached to the arms 112, 114 by attachment structures 118, 120 such that the head 102 can rotate about the tilt axis T. The frame 104 may be, directly or indirectly, rotatably attached to the base 106 by an attachment structure 122, where the head 102 and the frame 104 rotate together about the pan axis P. For example, the pan axis P may extend through the frame 104, the base 106, and the attachment structure 122.

In some example embodiments, the automated luminaire 100 may include a controller that controls the operation of the automated luminaire 100 including determining and controlling the tilt and pan positions of the head 102 based on rotational position information received from the absolute encoders. As can be readily understood by those of ordinary skill in the art, absolute encoders such as those used in the automated luminaire 100 provide rotational/angular position information. For example, magnetic encoders, optical encoders, and/or another type of encoders may be used in the automated luminaire 100.

As explained in more detail below, the automated luminaire 100 may include an absolute encoder that is used to determine the tilt position of the head 102. The automated luminaire 100 may also include multiple absolute encoders (e.g., two absolute encoders) that are used to determine the pan position of the head 102. To illustrate, by using two absolute encoders for pan, the controller can distinguish between overlapping pan positions of the head 102 that are in different full rotations of the head 102. For example, the controller can distinguish between the pan positions of 5 degrees and 365 degrees, where, for example, 0) degree is a reference pan position. After a device setup is performed to associate particular known tilt and pan positions of the head 102 with rotational position information provided by the absolute encoders, subsequent rotational position information provided by the absolute encoders, for example, upon subsequent power-ups of the automated luminaire 100 after installation, may be used to determine the tilt and pan positions of the head 102 and to subsequently rotate the head 102 to desired tilt and pan positions.

By using rotational position information from absolute encoders to determine and change tilt and pan positions of the head 102, the head 102 of the automated luminaire 100 can be quickly moved to a desired tilt/pan position upon a power-up. By using multiple absolute encoders with respect to the pan position of the head 102, the automated luminaire 100 can quickly distinguish between overlapping pan positions (e.g., 100 degrees and 460 degrees) associated with different rotations of the head 102.

In some alternative embodiments, the automated luminaire 100 may have a different shape than shown in FIGS. 1A-3 without departing from the scope of this disclosure. For example, the head 102 and the base 106 may have different shapes than shown. Another example, the frame 104 may not be yoke-shaped without departing from the scope of this disclosure. In some example embodiments, the automated luminaire 100 may be oriented in a different manner than shown in FIGS. 1A-3. For example, the base 106 may be attached to a ceiling structure or to a mount that is attached to ceiling structure such that the base 106 is above the head 102.

Figure 2:
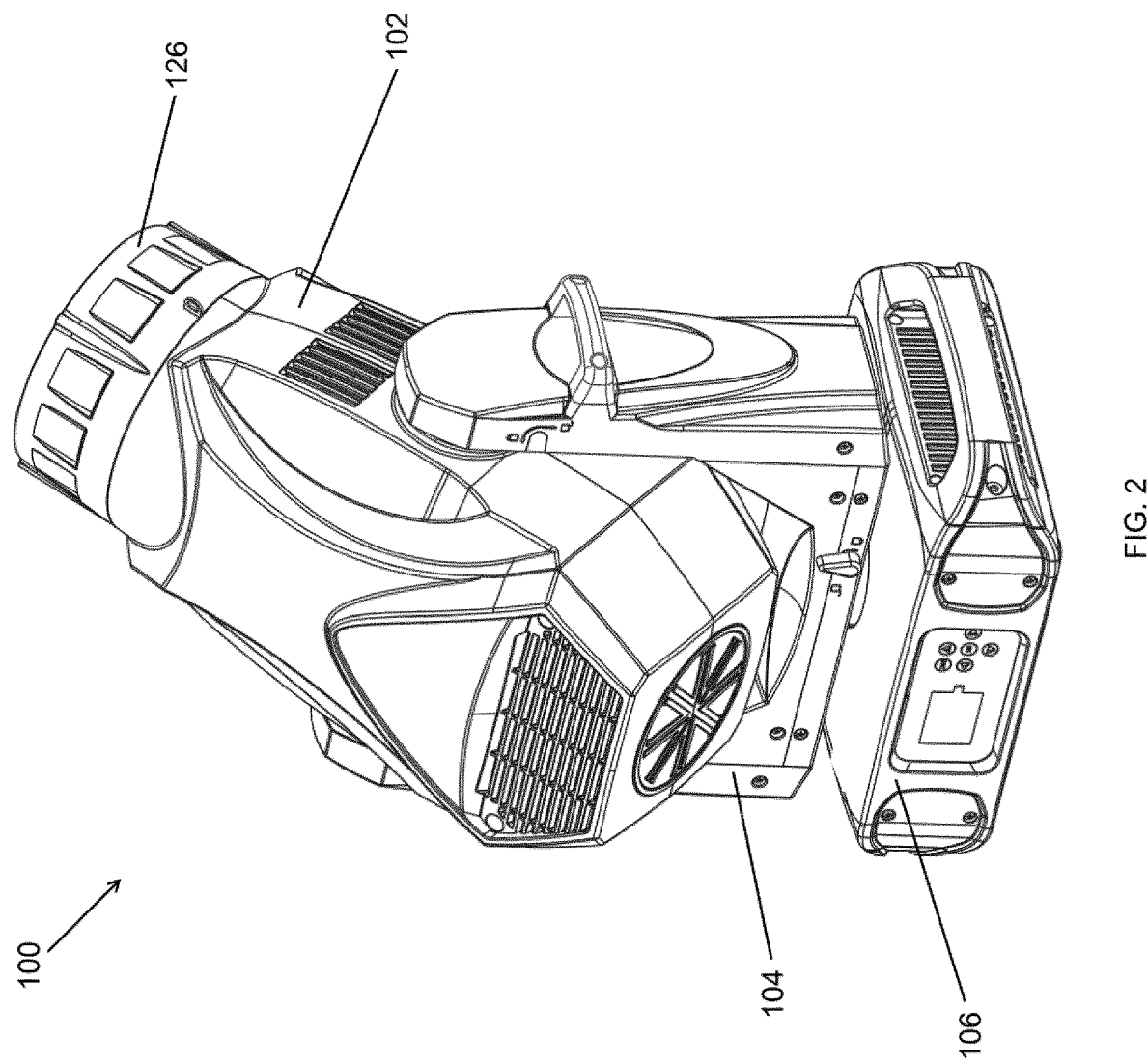
FIGS. 2 and 3 illustrate the head of the automated luminaire of FIGS. 1A-1C in different tilt and pan positions than shown in FIGS. 1A-IC according to an example embodiment.
Figure 3:
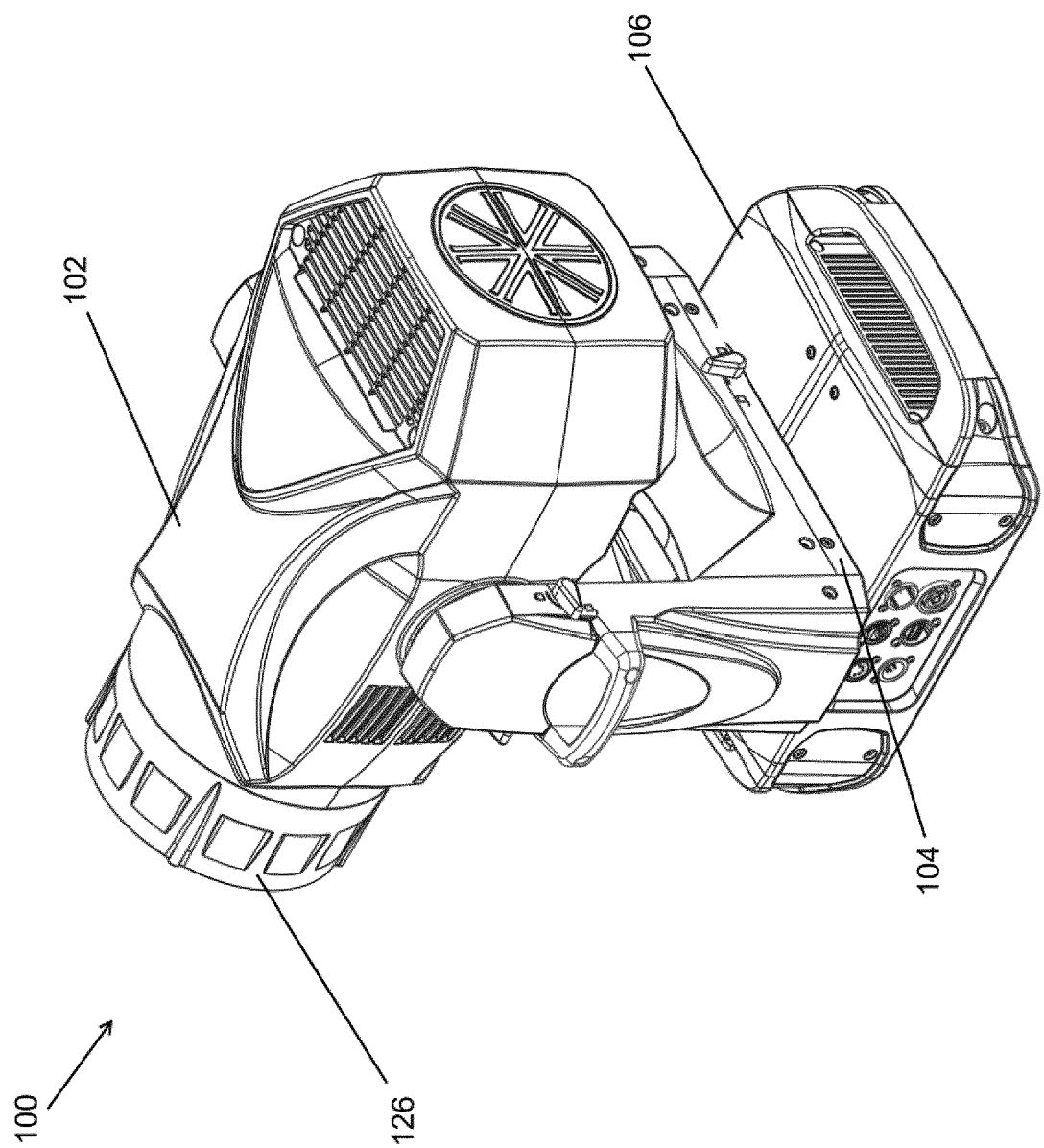
Figure 4:
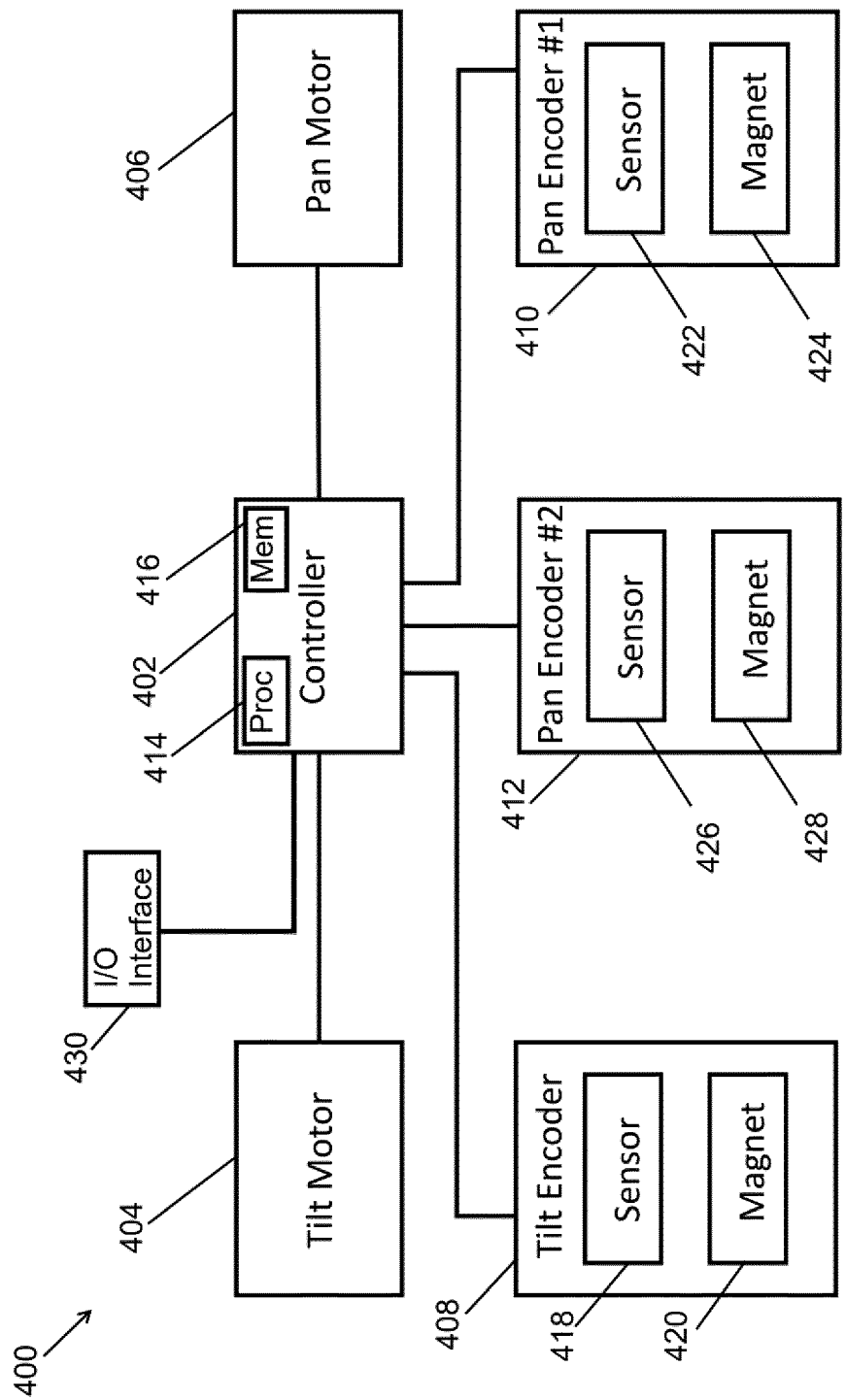
FIG. 4 illustrates a block diagram of the pan and tilt system of the automated luminaire of FIGS. 1A-3 according to an example embodiment.

FIG. 4 illustrates a block diagram of the pan and tilt system 400 of the automated luminaire 100 of FIGS. 1A-3 according to an example embodiment. Referring to FIGS. 1A-4, in some example embodiments, the automated luminaire 100 includes the system 400 that includes a controller 402, a tilt motor 404, a pan motor 406, a tilt absolute encoder 408, and pan absolute encoders 410 and 412. The system 400 may also include an input/output interface 430) that corresponds to or may be connected to the user interface 128 shown in FIG. 1B. In general, the controller 402 may be coupled to the tilt motor 404, the pan motor 406, the absolute encoders 408, 410, 412. The controller 402 may receive user input and provide information, such as status, via the interface 430).

In some example embodiments, the controller 402 may include one or more controllers and/or processors 414 and one or more memory devices 416 (e.g., a static memory device). For example, the one or more controllers and/or processors 414 may execute software code that may be stored in the one or more memory devices 406 to perform operations such as determining and controlling the position of the head 102. The one or more memory devices 406 may also be used to store data as can be readily understood by those of ordinary skill in the art with the benefit of the scope of this disclosure.

In some example embodiments, the controller 402 controls the tilt motor 404 to control the tilt position of the head 102. For example, the head 102 may be directly or indirectly coupled to the shaft of the tilt motor 404 such that the tilt position of the head 102 depends on the rotation of the tilt motor 404. The controller 402 may also control the pan motor 406 to control the pan position of the head 102. For example, the head 102 may be directly or indirectly coupled to the shaft of the pan motor 406 such that the pan position of the head 102 depends on the rotation of the pan motor 406.

In some example embodiments, the tilt absolute encoder 408 and the pan absolute encoders 410, 412 may be magnetic encoders. In general, a magnet of a magnetic encoder may be attached to rotate with a rotating structure (e.g., a shaft or a pulley) and the sensor of the magnetic encoder may be attached to a non-rotating structure close enough to the magnet to detect magnetic field. Alternatively, the magnet of a magnetic encoder may be attached to a non-rotating structure and the sensor of the magnetic encoder may be attached to a rotating structure (e.g., a shaft or a pulley) close enough to the magnet to detect magnetic field. To illustrate, the tilt absolute encoder 408 may include a magnet 420 and a sensor 418. The sensor 418 and the magnet 420 of the absolute encoder 408 are attached to different structures. For example, the sensor 418 may be attached to a rotating structure (e.g., a shaft of a motor or a pulley), and the magnet 420 may be attached to a structure that is rotationally static with respect to the rotating structure to which the sensor 418 is attached. Alternatively, the magnet 420 may be attached to a rotating structure (e.g., a shaft of a motor or a pulley), and the sensor 418 may be attached to a structure that is rotationally static with respect to the rotating structure.

In some example embodiments, the pan absolute encoder 410 may include a magnet 424 and a sensor 422, and the pan absolute encoder 412 may include a magnet 428 and a sensor 426. The sensor and the magnet of each absolute encoder 410, 412 may be attached to different structures from each other. For example, the sensor 422 may be attached to a rotating structure (e.g., a shaft of a motor or a pulley) and the magnet 424 may be attached to a structure that is rotationally static with respect to the rotating structure. Alternatively, the magnet 424 may be attached to a rotating structure (e.g., a shaft of a motor or a pulley) and the sensor 422 may be attached to a structure that is rotationally static with respect to the rotating structure. For example, the sensor 426 may be attached to a rotating structure (e.g., a shaft of a motor or a pulley) and the magnet 428 may be attached to a structure that is rotationally static with respect to the rotating structure. Alternatively, the magnet 428 may be attached to a rotating structure (e.g., a shaft of a motor or a pulley) and the sensor 426 may be attached to a structure that is rotationally static with respect to the rotating structure.

In some example embodiments, the tilt position of the head 102 depends on a rotation of the shaft of the tilt motor 404. To illustrate, the controller 402 may receive tilt rotational position information from the tilt absolute encoder 408 and may determine the tilt position of the head 102 from the tilt rotational position information. For example, the tilt rotational position information from the tilt absolute encoder 408 may include an angular value and/or other angular information associated with the shaft of the tilt motor 404. To illustrate, the sensor 418 or the magnet 420 may be attached to and rotate with the shaft of the tilt motor 404 or a drive pulley attached to the shaft. Alternatively, the tilt rotational position information may include an angular value and/or other angular information associated with a pulley or another structure coupled indirectly to the shaft of the tilt motor 404. For example, the sensor 418 or the magnet 420 may be attached to and rotate with a driven pulley coupled by a belt to a drive pulley that is attached the shaft of the tilt motor 404. In general, tilt rotational position information provided by the pan absolute encoder 408 may be the type of typical information that is provided by a magnetic encoder physically associated with a shaft or a pulley as can be readily understood by those of ordinary skill in the art with the benefit of the scope of this disclosure.

In some example embodiments, the pan position of the head 102 depends on the rotation of the shaft of the pan motor 406. The controller 402 may receive pan rotational position information from each of the pan absolute encoders 410, 412. The controller 402 may determine the pan position of the head 102 based on the pan rotational position information received from the pan absolute encoder 410 and from the pan absolute encoder 412. For example, the pan absolute encoder 410 may send an angular value and/or other angular information associated with the shaft of the pan motor 406 and/or with a drive pulley coupled to the shaft of the pan motor 406. To illustrate, the sensor 422 or the magnet 424 may be attached to and rotate with the shaft of the pan motor 406 or a drive pulley attached to the shaft. The pan rotational position information received from the pan absolute encoder 412 may include an angular value and/or other information associated with a driven pulley that is, for example, coupled to a drive pulley coupled to the shaft of the pan motor 406. To illustrate, the sensor 426 or the magnet 428 may be attached to and rotate with a driven pulley coupled by a belt to a drive pulley that is attached the shaft of the pan motor 406. In general, pan rotational position information provided by each pan absolute encoder 410, 412 may be the type of typical information that is provided by a magnetic encoder that is physically associated with a shaft or a pulley as can be readily understood by those of ordinary skill in the art with the benefit of the scope of this disclosure.

In some example embodiments, a device setup may be performed to associate, by the controller 402, a particular (e.g., a reference) tilt position of the head 102 with a tilt rotational position (e.g., an angular value) indicated by the tilt rotational position information received from the absolute encoder 408. To illustrate, during a device setup process, the controller 402 may control the tilt motor 404 to rotate/tilt the head 102 to a reference tilt position, such as a tilt end-of-travel position, where the head 102 may be directly or indirectly physically prevented from further rotation in the same direction. Because the reference tilt position (e.g., the end-of-travel location considered as 0 degree or another angular value) is known by design, the controller 402 can associate the known reference tilt position with the rotational position (e.g., the angular value) indicated by the tilt rotational position information received from the absolute encoder 408 while the head 102 is at the known reference tilt position. In some alternative embodiments, instead of the controller 402, a person (e.g., a technician) may manually move the head 102 to the reference tilt position (e.g., the end-of-travel location) before or during the device setup process, and the controller 402 may perform the device setup by associating the reference tilt position with the rotational position (e.g., an angular value) indicated by the tilt rotational position information provided by the absolute encoder 408 while the head 102 is at the reference tilt position.

In some example embodiments, after the controller 402 associates the known reference tilt position of the head 102 with a particular tilt rotational position (e.g., the angular value) received from the absolute encoder 408 as described above, the controller 402 may store the particular tilt rotational position and use it to determine subsequent tilt positions of the head 102. To illustrate, during the device setup process and after the device setup process (e.g., upon subsequent power-ups of the automated luminaire 100), the controller 402 may use the stored (reference) tilt rotational position to determine subsequent tilt positions of the head 102 based on tilt rotational position information subsequently received from the absolute encoder 408 when the head 102 is at other tilt positions. For example, the controller 402 may determine a subsequent tilt position (e.g., 5 degrees, 240) degrees, 260) degrees) of the head 102 based on the difference between the stored (reference) tilt rotational position and a tilt rotational position subsequently received from the absolute encoder 408 when the head 102 is at another tilt position at power up.

In some example embodiments, the device setup process may include one or more operations to associate, by the controller 402, a particular (e.g., a reference) pan position of the head 102 with a first pan rotational position (e.g., an angular value) indicated by the pan rotational position information received from the pan absolute encoder 410 and with a second pan rotational position (e.g., an angular value) indicated by the pan rotational position information received from the pan absolute encoder 412. To illustrate, during the device setup process, the controller 402 may control the pan motor 406 to rotate/pan the head 102 to a reference pan position, such as a pan end-of-travel position, where the head 102 is directly or indirectly physically prevented from further rotation in the same direction. Because the reference pan position (e.g., the end-of-travel location considered as 0 degree or another angular value) is known by design, the controller 402 can associate the reference pan position with the pan rotational positions (e.g., the angular values) indicated by the pan rotational position information received from the pan absolute encoders 410, 412 while the head 102 is at the reference pan position. In some alternative embodiments, instead of the controller 402, a person (e.g., a technician) may manually move the head 102 to the reference pan position (e.g., the pan end-of-travel location) before or during that device setup process, and the controller 402 may perform the device setup by associating the reference pan position with the pan rotational positions (e.g., the angular values) indicated by the pan rotational position information received from the absolute encoders 410, 412 while the head 102 is at the reference pan position.

In some example embodiments, after the controller 402 associates the known reference pan position of the head 102 with both the particular pan rotational position (e.g., the angular value) received from the absolute encoder 410 and with the particular pan rotational position (e.g., the angular value) received from the absolute encoder 412 as described above, the controller 402 may store and use the particular pan rotational positions to determine subsequent pan positions of the head 102. To illustrate, during the device setup process and after the device setup process (e.g., upon subsequent power-up of the automated luminaire 100), the controller 402 may use the stored (reference) pan rotational positions to determine subsequent pan positions of the head 102 based on pan rotational position information subsequently received from each of the absolute encoders 410, 412 when the head 102 is at other pan positions. For example, when the head 102 is subsequently at another pan position, the controller 402 may determine the subsequent pan position (e.g., 10 degrees, 270) degrees, 460 degrees, etc.) of the head 102 based on the difference between the stored pan rotational position (e.g., an angular value) received from the absolute encoder 410 and a pan rotational position (e.g., an angular value) subsequently received from the absolute encoder 410 and based on the difference between the stored pan rotational position (e.g., an angular value) received from the absolute encoder 412 and a pan rotational position (e.g., an angular value) subsequently received from the absolute encoder 412.

In some example embodiments, by physically associating the absolute encoders 410, 412 with coupled (e.g., by a belt) rotating components (e.g., a drive pulley and a driven pulley) that have a non-integer gear or diameter ratio (e.g., driven pulley to drive pulley ratio of 5.33), the pan rotational position received from at least one of the absolute encoders 410, 412 may be different for overlapping pan positions of the head 102. For example, the pan rotational position received from each of the absolute encoders 410, 412 may be 0 degree when the head 102 is at 0-degree pan position (e.g., a reference pan position). When the head 102 is at 360-degree pan position (i.e., overlapping with the ( ) degree pan position), the pan rotational position received from the absolute encoder 410 may be 0 degree while the pan rotational position received from the absolute encoder 412 may be degrees because of a non-integer gear/diameter ratio of the pulleys. That is, the controller 402 may determine whether the pan position of the head 102 is more than 360 degrees (i.e., more than a full rotation) from a reference pan position. Because of the non-integer gear or diameter ratio, the controller 402 may also determine whether the pan position of the head 102 is more than 720 degrees (i.e., more than two or more full rotations) from a reference pan position.

In some example embodiments, the device setup process may be performed at the factory during manufacturing, for example, in response to a user input or initial power-up. Alternatively or in addition, the device setup process may be performed after leaving the factory but before installation. In general, once the device setup process described above is performed, further device setup may not be required after installation of the automated luminaire 100. To illustrate, the head 102 may be in an unknown tilt and pan position right before the powering up of the automated luminaire 100. Upon the powering up of the automated luminaire 100 and/or in response to a user input, the controller 402 may determine, as part of a calibration process, the tilt position of the head 102 based on the tilt rotational position information (that includes the tilt rotational position) received from the tilt absolute encoder 408. As part of the calibration process, the controller 402 may also determine the pan position of the head 102 based on the pan rotational position information (that includes the pan rotational position) received from each of the pan absolute encoders 410, 412. In some alternative embodiments, the device setup process may be performed after the installation of the automated luminaire 100, for example, in response to a user input.

During a calibration process (for example, subsequent to the installation of the automated luminaire 100), the controller 402 may determine the tilt position of the head 102 by calculating the difference between the stored (reference) tilt rotational position received during the device setup and a tilt rotational position received from the tilt absolute encoder 408, for example, at power up or during the calibration. For example, the calibration process may be initiated by the powering up of the automated luminaire 100 or in response to a particular user input. As part of the calibration process, the controller 402 may also determine the pan position of the head 102 based on the difference between the stored pan rotational position received from the absolute encoder 410 during device setup and a pan rotational position received from the absolute encoder 410, for example, upon power up or during calibration and based on the difference between the stored pan rotational position received from the absolute encoder 412 during device setup and a pan rotational position received from the absolute encoder 412, for example, upon power up or during calibration. After the controller 402 determines the tilt position of the head 102, the controller 402 may control the motor 404 to rotate/tilt the head 102 to a particular tilt position that may be a default programmed tilt position or a tilt position indicated via a Digital Multiplex (DMX) protocol input provided to the controller 402. The controller 402 may control the motor 404 to rotate/tilt the head 102 based on and relative to the tilt position of the head 102 determined upon power up. After the controller 402 determines the pan position of the head 102, the controller 402 may control the motor 406 to rotate/pan the head 102 to a particular pan position that may be a default programmed pan position or a pan position indicated via a DMX protocol input provided to the controller 402. The controller 402 may control the motor 404 to rotate/pan the head 102 based on and relative to the pan position of the head 102 determined upon power up.

In some alternative embodiments, the pan and tilt system 400 of the automated luminaire 100 may include other components without departing from the scope of this disclosure. In some alternative embodiments, the controller 402 may include multiple controllers and/or processors without departing from the scope of this disclosure. In some alternative embodiments, optical absolute encoders may be used instead of some or all of the magnetic absolute encoders shown in FIG. 4. In some example embodiments, the reference tilt position may be at a tilt position other than the tilt end-of-travel position without departing from the scope of this disclosure. In some example embodiments, the reference pan position may be at a pan position other than the pan end-of-travel position without departing from the scope of this disclosure.

Figure 5:
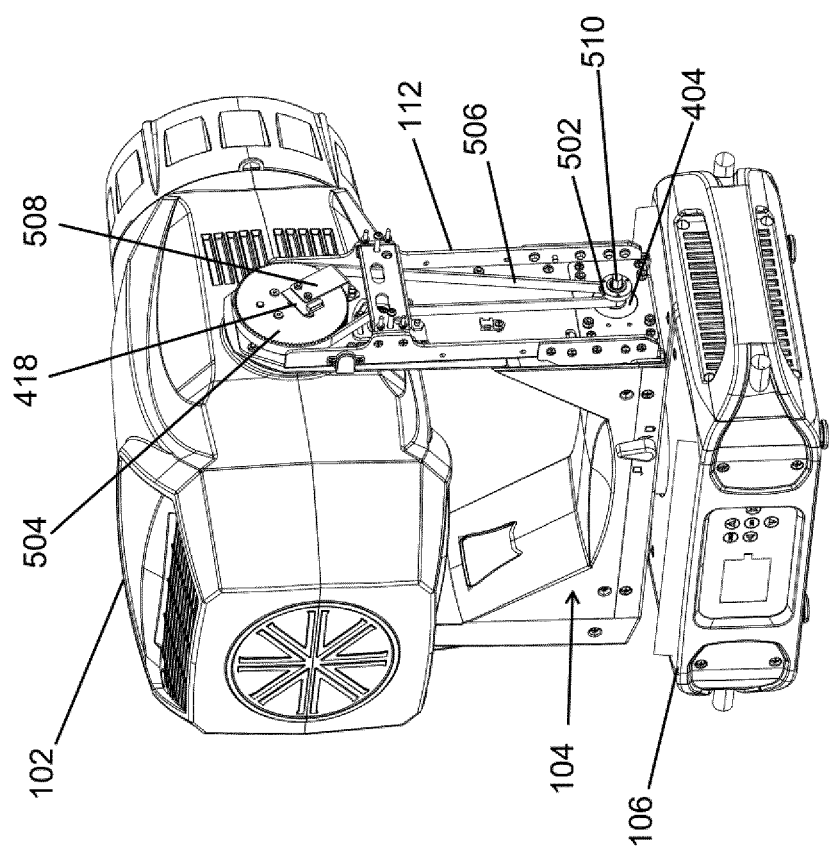
FIG. 5 illustrates tilt control components of the automated luminaire of FIGS. 1A-3 according to an example embodiment.
Figure 6:
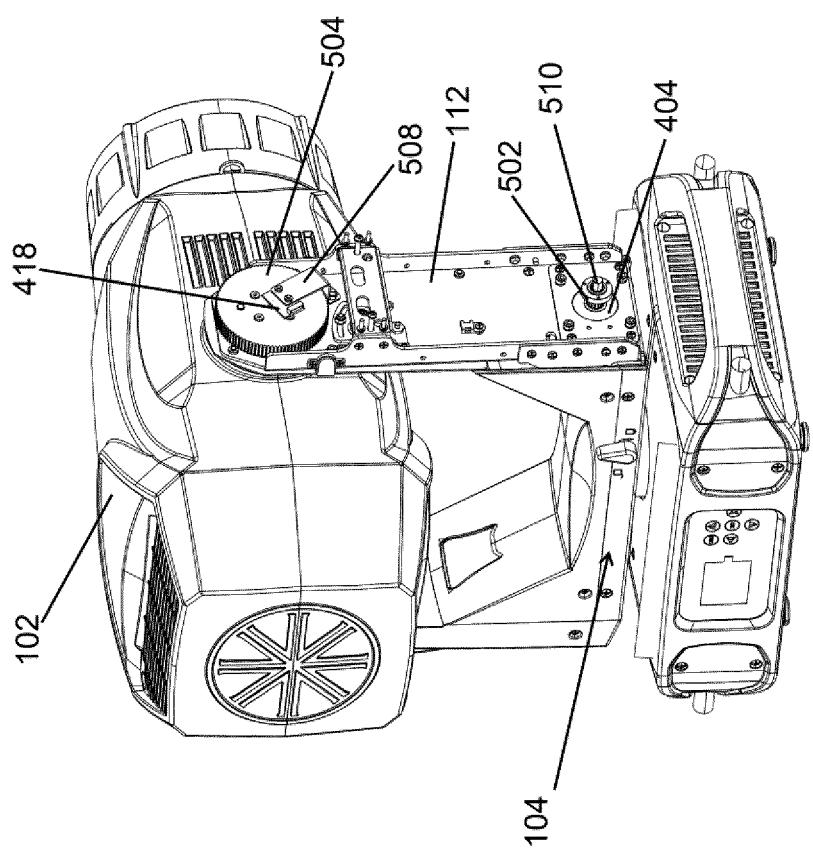
FIG. 6 illustrates tilt control components of the automated luminaire of FIGS. 1-3 with the belt shown in FIG. 5 illustratively omitted according to an example embodiment.
Figure 7:
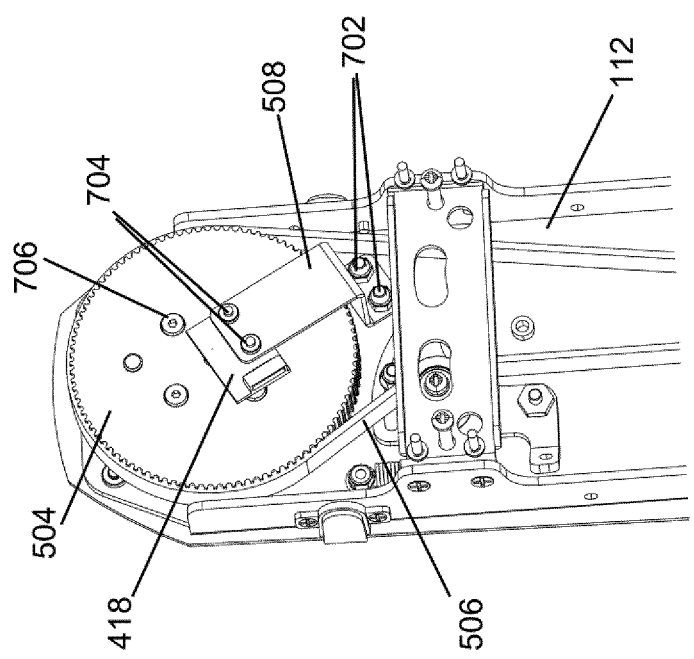
FIG. 7 illustrates a close-up view of some of tilt control components shown in FIG. 5 according to an example embodiment.
Figure 8:
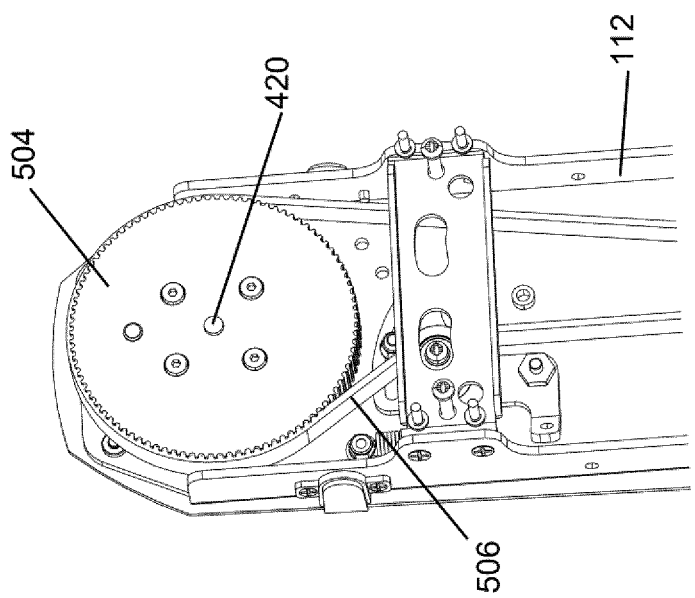
FIG. 8 illustrates a close-up view of some of tilt control components shown in FIG. 5 according to an example embodiment.

FIG. 5 illustrates tilt control components of the automated luminaire 100 of FIGS. 1A-3 according to an example embodiment, FIG. 6 illustrates tilt control components of the automated luminaire 100 of FIGS. 1-3 with a belt 506 shown in FIG. 5 omitted according to an example embodiment, and FIGS. 7 and 8 illustrate close-up views of some of tilt control components shown in FIG. 5 according to an example embodiment. Referring to FIGS. 1A-8, in some example embodiments, the automated luminaire 100 includes a drive pulley 502 and a driven pulley 504 that are rotationally coupled to each other by the belt 506. For example, the pulleys 502, 504 may be positioned in a compartment of the arm 112 of the frame 104. The tilt motor 404 may be positioned in the frame 104 such that the drive pulley 502 is attached to a shaft 510 of the motor 404. The drive pulley 502 and the driven pulley 504 are coupled to each other by the belt 506 such that the rotation of the shaft 510 of the tilt motor 404 can cause the driven pulley 504 to rotate.

In some example embodiments, the driven pulley 504 may be coupled to the attachment structure 118. For example, the driven pulley 504 may be attached to the attachment structure 118 by fasteners (e.g., a fastener 706 shown in FIG. 7). One or more components of the attachment structure 118 may be directly and/or indirectly coupled to the head 102 and the driven pulley 504 such that the head 102 rotates along with the driven pulley 504. One or more components of the attachment structure 118 may be statically attached to the arm 112 such that the head 102 rotates about the tilt axis T.

In some example embodiments, a bracket 508 is used to retain the sensor 418 of the tilt absolute encoder 408 near the magnet 420 of the tilt absolute encoder 408. For example, fasteners 702 may be used to attach the bracket 508 to the arm 112, and fasteners 704 may be used to attach the sensor 418 to the bracket 508 at a desired location near the magnet 420 (more clearly shown in FIG. 8). The magnet 420 is attached to the driven pulley 504 such that the magnet 420 rotates along with the pulley 504. For example, the magnet 420 may be magnetically attached to the pulley 504. The bracket 508 retains the sensor 418 such that the magnetic 420 can rotate relative to the sensor 418 when the driven pulley 504 is rotating.

In some example embodiments, the controller 402 shown in FIG. 4 may be located in the base 106 of the automated luminaire 100. The controller 402 may be communicably coupled to the sensor 418 of the tilt absolute encoder 408 to receive tilt rotational position information from the sensor 418 as described above with respect to the tilt absolute encoder 408.

In some alternative embodiments, the sensor 418 and the magnet 420 may be at different locations than shown without departing from the scope of this disclosure. In some alternative embodiments, the sensor 418 may be rotatably attached to the pulley 504, and the magnetic 420 may be retained near the sensor 418, for example, by a bracket. In some alternative embodiments, one or more of the tilt control components may be at different locations than shown without departing from the scope of this disclosure. In some alternative embodiments, the automated luminaire 100 may include other tilt control components than shown without departing from the scope of this disclosure. In some alternative embodiments, one or more of the tilt control components may be omitted without departing from the scope of this disclosure. In some alternative embodiments, the motor 404 may control the rotation/tilting of the head 102 in a different manner than shown without departing from the scope of this disclosure.

Figure 9:
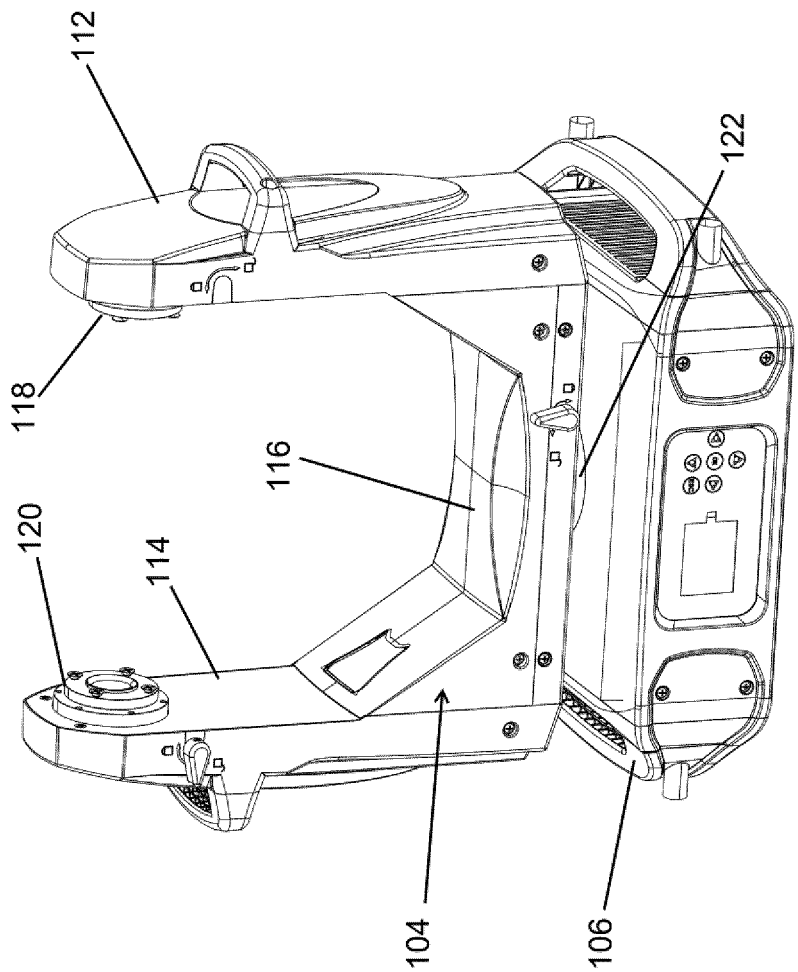
FIG. 9 illustrates the automated luminaire of FIGS. 1A-3 with the head illustratively omitted according to an example embodiment.
Figure 10:
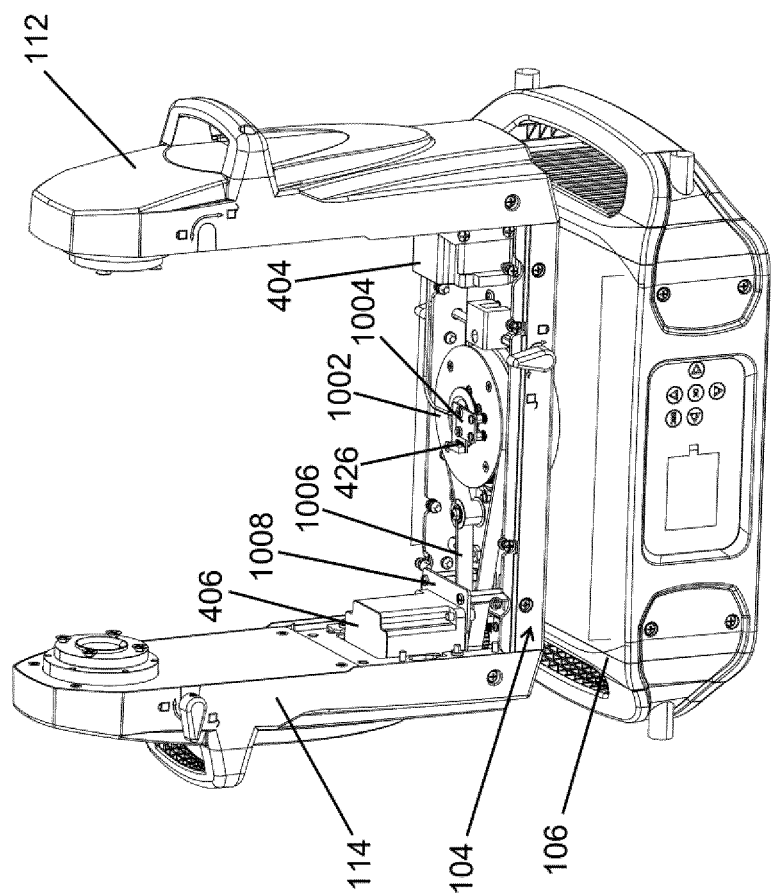
FIG. 10 illustrates pan control components of the automated luminaire of FIGS. 1A-3 according to an example embodiment.
Figure 11:
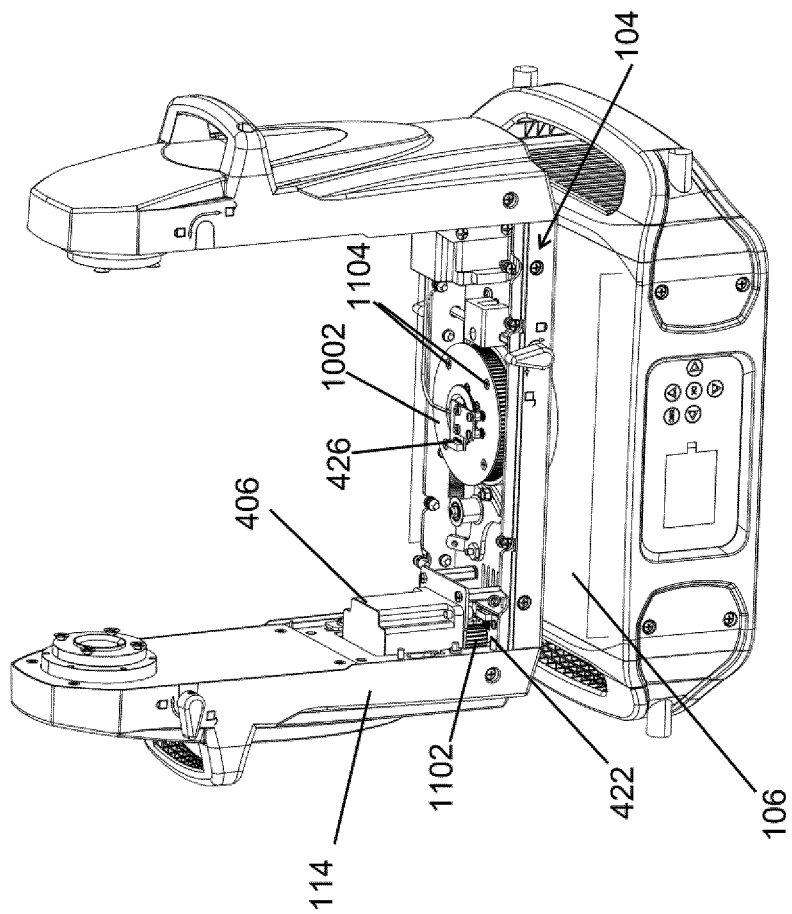
FIG. 11 illustrates pan control components of the automated luminaire of FIGS. 1-3 with the belt shown in FIG. 10 illustratively omitted according to an example embodiment.
Figure 12:
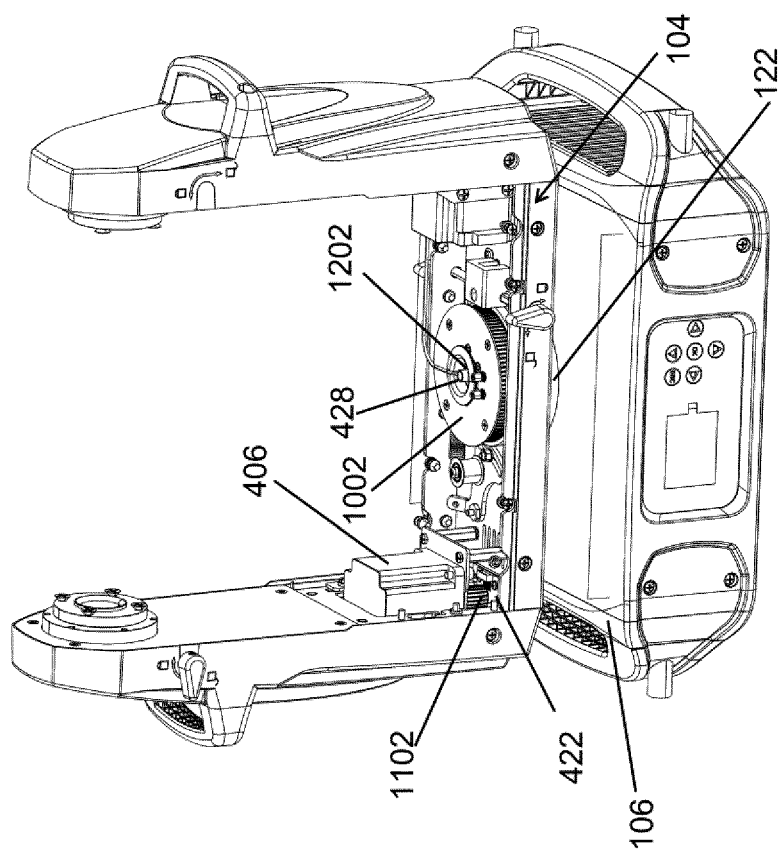
FIG. 12 illustrates pan control components of the automated luminaire of FIGS. 1-3 showing a magnet of an absolute encoder located at a driven pulley according to an example embodiment.
Figure 13:
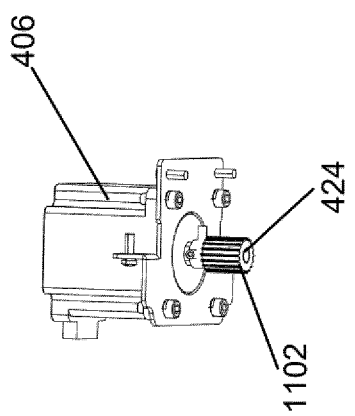
FIG. 13 illustrates a pan motor of the automated luminaire of FIGS. 1A-3 showing a magnet of an absolute encoder located at a drive pulley coupled to the pan motor according to an example embodiment.

FIG. 9 illustrates the automated luminaire 100 of FIGS. 1A-3 with the head 102 illustratively omitted according to an example embodiment, and FIG. 10 illustrates pan control components of the automated luminaire 100 of FIGS. 1A-3 according to an example embodiment. FIG. 11 illustrates pan control components of the automated luminaire 100 of FIGS. 1-3 with the belt 1006 shown in FIG. 10 illustratively omitted according to an example embodiment. FIG. 12 illustrates pan control components of the automated luminaire 100 of FIGS. 1-3 showing the magnet 428 of the absolute encoder 412 located at a driven pulley 1002 according to an example embodiment. FIG. 13 illustrates the pan motor 406 of the automated luminaire of FIGS. 1A-3 showing the magnet 424 of the absolute encoder 410 located at a drive pulley 1102 coupled to the pan motor 406 according to an example embodiment.

Referring to FIGS. 1A-13, in some example embodiments, the pan motor 406 may be located in the frame 104 as more clearly shown in FIGS. 10-12. For example, the pan motor 406 may be positioned on a support platform 1008, and the drive pulley 1002 may be attached to the shaft of the motor 406. The driven pulley 1002 may be coupled to the drive pulley 1102 by the belt 1006 such that the rotation of the motor 406 can cause the driven pulley 1002 to rotate. The driven pulley 1002 may be attached, directly or indirectly, to the frame 104 such the frame 104 can rotate along with the driven pulley 1002. The driven pulley 1002 may be attached to the frame 104, for example, by one or more fasteners such as fasteners 1104. Alternatively, the driven pulley 1002 may be attached to another structure that is attached to the frame 104.

In some example embodiments, the sensor 426 of the pan absolute encoder 412 may be retained by a bracket 1004 near the magnet 428 (more clearly shown in FIG. 12) of the pan absolute encoder 412. For example, the bracket 1004 may be attached to the driven pulley 1002 such that the sensor 426 rotates along with the driven pulley 1002. The magnet 428 may be attached to a structure 1202 that is rotationally static with respect to the frame 104 and the pulley 1002 such that the sensor 426 rotates near the magnet 428 while the magnet 428 is static. For example, the structure 1202 may be part of the attachment structure 122 or another structure that is attached to the base 106.

In some example embodiments, the drive pulley 1102 may be attached to the shaft of the pan motor 406 as can be readily understood by those of ordinary skill in the art with the benefit of the scope of this disclosure. The sensor 422 of the pan absolute encoder 410 may be located near the magnet 424 of the pan absolute encoder 410. For example, the magnet 424 may be attached to the drive pulley 1102 (e.g., magnetically) that is attached to shaft of the pan motor 406 as more clearly shown in FIG. 13. The magnet 424 may be attached to the drive pulley 1102 such that the magnet 424 rotates along with the drive pulley 1102 and near the sensor 422 as can be readily understood by those of ordinary skill in the art with the benefit of the scope of this disclosure. As the motor 406 rotates, the drive pulley 1102 and the driven pulley 1002 rotate coupled to each other by the belt 1106. The driven pulley 1002 may be rotatably attached to the attachment structure 122 or to another structure that is non-rotatably attached to the base 106. As the drive pulley 1102 and the driven pulley 1002, the frame 104 and the head 102 attached to the frame 104 can rotate the pan axis P, resulting in changes in the pan position of the head 102.

In some example embodiments, the gear/diameter ratio of the driven pulley 1002 to the drive pulley 1102 may be a non-integer number (e.g., 4.9, 5.33, or 5.5) as described above. As described above, the non-integer number ratio of the driven pulley 1002 to the drive pulley 1102 may result in the pan encoders 410, 412 providing pan rotational position information to the controller 402 that allows the controller 402 to distinguish between overlapping pan positions (e.g., between 10 degrees and 370 degrees from a reference pan position taken as 0 degree) of the head 102, for example, at the power up of the automated luminaire 100 for use. The controller 402 may be communicably coupled to the sensors 422, 426 to receive pan rotational position information from the sensors 422, 426 as described above with respect to the pan absolute encoder 410, 412.

In some alternative embodiments, the automated luminaire 100 may include other types of magnetic absolute encoders instead of or in addition to the encoders 408, 410, 412 without departing from the scope of this disclosure. In some alternative embodiments, the automated luminaire 100 may include other types of absolute encoders (e.g., optical, laser, etc.) instead of or in addition to the absolute encoders 408, 410, 412 without departing from the scope of this disclosure. In some alternative embodiments, the magnets and sensors of the absolute encoders may be attached to different structures and/or at different locations than shown without departing from the scope of this disclosure. In some alternative embodiments, a magnet of an absolute encoder shown attached to a rotating structure may instead be attached to a non-rotating structure and a corresponding sensor shown attached to a non-rotating structure may instead be attached to a rotating structure without departing from the scope of this disclosure. In some alternative embodiments, the motors and/or other components of automated luminaire 100 may be at different locations than shown without departing from the scope of this disclosure. In some alternative embodiments, the pulleys may be coupled in a different manner than using a belt without departing from the scope of this disclosure.

Figure 14:
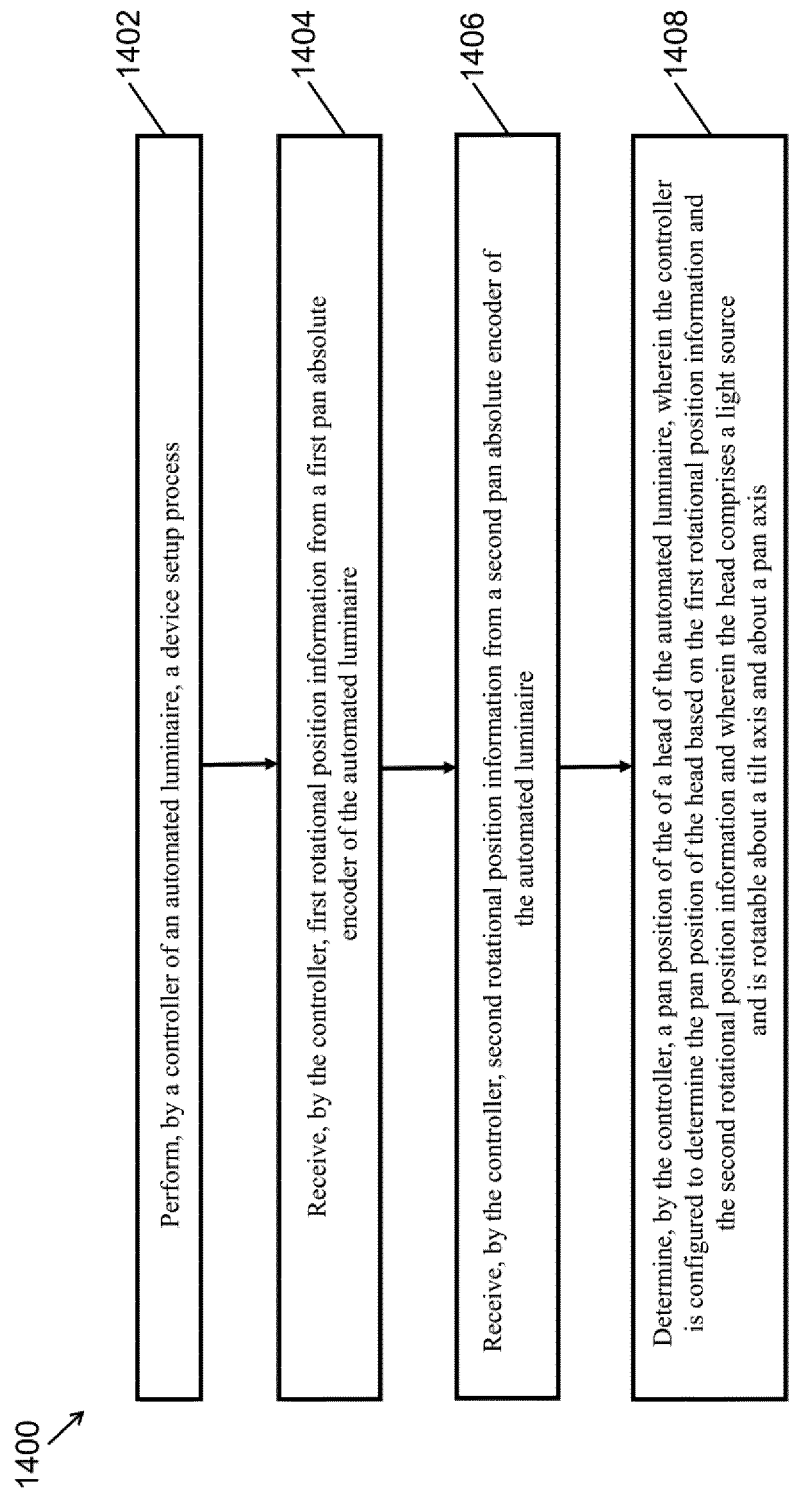
FIG. 14 illustrates a method of operating the automated luminaire of FIGS. 1A-3 according to an example embodiment.

FIG. 14 illustrates a method 1400 of operating the automated luminaire 100 of FIGS. 1A-3 according to an example embodiment. Referring to FIGS. 1A-14, in some example embodiments, the method 400 includes, at step 1402, performing, by the controller 402 of the automated luminaire 100, a device setup process. For example, the controller 402 may perform the device setup process as described above, where information related to reference pan and tilt positions are stored. For example, the head 102 may be rotated to a reference tilt position during a device setup process, and the controller 402 may associate the reference tilt position with a tilt rotational position indicated by the tilt absolute encoder 408 while the head 102 is at the reference tilt position. The head 102 may also be rotated to a reference pan position during a device setup process, and the controller 402 may associate the reference pan position with a first pan rotational position indicated by the first pan absolute encoder 410 and with a second pan rotational position indicated by the second pan absolute encoder 412 while the head 102 is at the reference pan position. The controller 402 may save the first pan rotational position (e.g., an angular value) and the second pan rotational position (e.g., an angular value) in the one or more memory devices 416 as pan rotational positions associated with the reference pan position of the head 102. The controller 402 may save the tilt rotational position (e.g., an angular value) associated with the reference tilt position of the head 102.

In some example embodiments, the method 400 may include at step 1404, for example, upon a power-up of the automated luminaire 100 subsequent to the device setup process, receiving, by the controller 402 of the automated luminaire 100, first rotational position information from the pan absolute encoder 410 of the automated luminaire. At step 1406, the method 400 may include receiving, by the controller 402, second rotational position information from the second pan absolute encoder 412 of the automated luminaire 100. At step 1408, the method 400 may include determining, by the controller 402, a pan position of the of the head 102 of the automated luminaire 100, for example, upon a power-up of the automated luminaire. The controller 402 is configured to determine the pan position of the head 102 based on the first rotational position information and the second rotational position information. The pan position of the head 102 may be determined by the controller 402 also based on the pan rotational positions/the pan reference position from the device setup process. The head 102 includes a light source 108 and is rotatable about a tilt axis T and about a pan axis P. The method 400 may include rotating the head 102 to a desired pan position after determining the pan position of the of the head 102 of the automated luminaire 100.

In some example embodiments, the method 1400 may also include determining, by the controller 402, a tilt position of the head 102 based on a tilt reference position of the head 102 and tilt rotational position information that is received from the tilt absolute encoder 408 of the automated luminaire 100. For example, the controller 402 may determine a tilt position of the head 102 and rotate the head 102 to a desired tilt position prior to moving the head 102 a desired pan position.

In some alternative embodiments, the method 1400 may include other steps without departing from the scope of this disclosure. In some alternative embodiments, some steps of the method 1400 may be performed in a different order than shown without departing from the scope of this disclosure. In some example embodiments, the device setup process described above may also be performed after step 1408, for example, as a re-device setup process. In some alternative embodiments, one or more steps of the method 1400 may be omitted without departing from the scope of this disclosure.

Although particular embodiments have been described herein in detail, the descriptions are by way of example. The features of the embodiments described herein are representative and, in alternative embodiments, certain features, elements, and/or steps may be added or omitted. Additionally, modifications to aspects of the embodiments described herein may be made by those skilled in the art without departing from the scope of the following claims, the scope of which are to be accorded the broadest interpretation so as to encompass modifications and equivalent structures.

What is claimed is:

1. A luminaire, comprising:
   a head comprising a light source, wherein the head is rotatable about a tilt axis (T) and about a pan axis (P);
   a first pan absolute encoder;
   a second pan absolute encoder;
   a controller configured to determine a pan position of the head, wherein the controller is configured to determine the pan position of the head based on first rotational position information received from the first pan absolute encoder and second rotational position information received from the second pan absolute encoder; and
   a drive pulley and a driven pulley that are connected by a belt, wherein a ratio of a first gear or diameter of the driven pulley to a second gear or diameter of the drive pulley is a non-integer number.

2. The luminaire of claim 1, wherein the head is rotated to the reference pan position during a device setup process, wherein the controller is configured to associate the reference pan position with a first pan rotational position indicated by the first pan absolute encoder and with a second pan rotational position indicated by the second pan absolute encoder while the head is at the reference pan position.

3. The luminaire of claim 1, further comprising a pan motor coupled to the drive pulley, wherein the controller is configured to control the pan motor to rotate the head to a default pan location or to a desired pan location indicated by an input received by the automated luminaire.

4. The luminaire of claim 1, further comprising a frame and a base, wherein the frame is rotatably attached to the base and wherein the head is attached to the frame such that the head is rotatable about the tilt axis (T) independent of the frame and such that the head and the frame are rotatable together about the pan axis (P).

5. The luminaire of claim 4, further comprising a tilt absolute encoder, wherein the controller is configured to determine a tilt position of the head based on a tilt reference position and tilt rotational position information that is received from the tilt absolute encoder.

6. The luminaire of claim 5, wherein the head is rotated to the reference tilt position during a device setup process, wherein the controller is configured to associate the reference tilt position with a tilt rotational position indicated by the first pan absolute encoder while the head is at the reference tilt position.

7. The luminaire of claim 5, further comprising a tilt motor, a tilt motor drive pulley, and a tilt motor driven pulley, wherein the tilt motor drive pulley and the tilt motor driven pulley are connected by a belt and wherein the tilt absolute encoder is located at the drive pulley.

8. The luminaire of claim 7, wherein the controller is configured to control the tilt motor to rotate the head to a default tilt location or to a desired tilt location indicated by an input received by the automated luminaire.

9. The luminaire of claim 1, wherein the first pan absolute encoder and the second pan absolute encoder each comprises a magnet and a sensor.

10. The luminaire of claim 1, wherein the first pan absolute encoder is associated with the drive pulley.

11. The luminaire of claim 1, wherein the second pan absolute encoder is associated with the driven pulley.

12. The luminaire of claim 1, wherein the first pan absolute encoder is associated with the drive pulley, and wherein the second pan absolute encoder is associated with the driven pulley.

13. The luminaire of claim 1, wherein the first pan absolute encoder is located at the drive pulley.

14. The luminaire of claim 1, wherein the second pan absolute encoder is located at the driven pulley.

15. The luminaire of claim 1, wherein the first pan absolute encoder is adjacent to the drive pulley.

16. The luminaire of claim 1, wherein the second pan absolute encoder is adjacent to the driven pulley.

17. The luminaire of claim 1, wherein the first pan absolute encoder is adjacent to the drive pulley, and wherein the second pan absolute encoder is adjacent to the driven pulley.

18. The luminaire of claim 1, wherein the controller is configured to determine whether the pan position of the head is more than 360 degrees from a reference pan position.

* * * * *